United States Patent Office 2,902,792
Patented Sept. 8, 1959

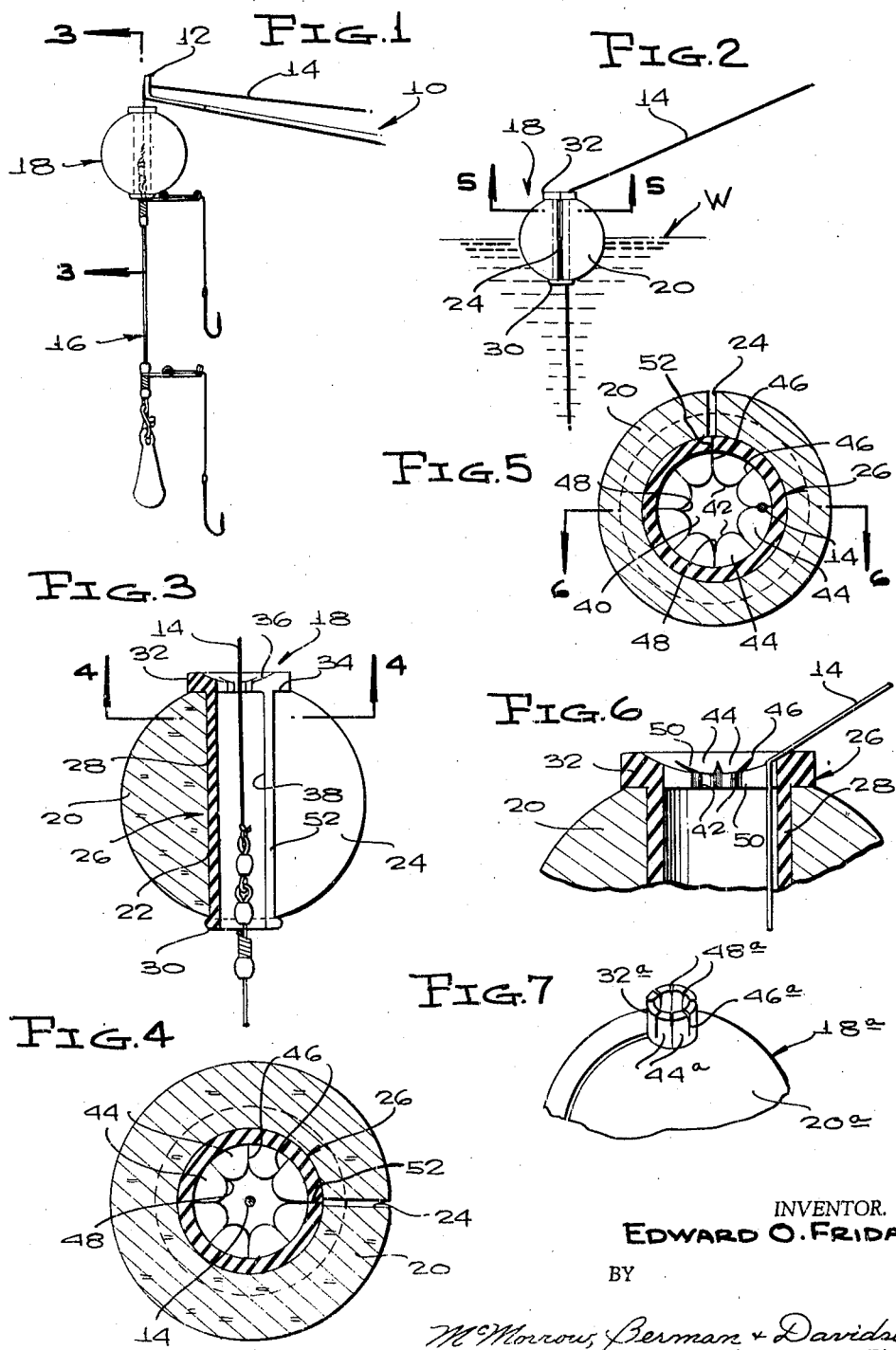

2,902,792

DEPTH SETTABLE FISHING FLOATS

Edward O. Friday, Versailles, Mo.

Application March 28, 1958, Serial No. 724,584

6 Claims. (Cl. 43—44.87)

This invention relates to improvements in fishing floats which are adapted to be set at different points along fishing lines, as for bottom fishing.

The primary object of the invention is to provide more efficient and more easily settable floats of this kind which can be used with casting rods and which can be set at any desired locations on the fishing lines thereof and released without being touched by the fisherman and without making knots or other improvisations on the lines, so that a fisherman can cast to any desired distance and then set a float and thereafter release the float and reset the float, without reeling in or reeling out the line.

Another object of the invention is to provide floats of the character indicated above which are simple and uncomplicated in construction, have no corrodible or other metal components, and which are composed of only two parts, and can be made in rugged, durable, and well-finished forms at relatively low cost.

Other important objects and advantageous features of the invention will be apparent from the following description and the accompanying drawings, wherein, for purposes of illustration only, specific forms of the invention are set forth in detail.

In the drawings:

Figure 1 is a schematic side elevation showing a float of the invention through which is strung a fishing line leading from the tip of a fishing rod;

Figure 2 is a schematic side elevation showing the float of Figure 1 set on a fishing line and floating upon the surface of water;

Figure 3 is an enlarged vertical transverse section taken on the line 3—3 of Figure 1, showing a fishing line free in the float;

Figure 4 is a horizontal section taken on the line 4—4 of Figure 3;

Figure 5 is a view similar to Figure 4, but showing a fishing line secured or set in the float;

Figure 6 is an enlarged fragmentary vertical transverse section taken on the line 6—6 of Figure 5; and Figure 7 is a fragmentary top perspective view of another form of the invention.

Referring in detail to the drawings, wherein like or similar numerals designate like parts throughout the several views, and first to Figures 1 to 6, the numeral 10 generally designates a fishing rod having a tip 12, through which is run a fishing line 14 having secured on its lower end a hook and sinker assembly 16, and a settable float, generally designated 18, is circumposed on the fishing line 14 between the rod tip 12 and the hook and sinker assembly 16.

The float 18 comprises a buoyant float body 20, of any desired shape, here shown as spherical or ball-shaped, having therethrough an axial smooth preferably cylindrical bore 22, into one side of which leads a longitudinal diametrical slot 24 which opens through the periphery of the body 20. A tubular ferrule or stem 26 is removably engaged in the bore 22.

The stem 26 conforms in exterior shape to that of the float body bore 22, and is slightly larger in cross section than the bore 22, so as to have a snug frictional fit therein. The stem 26 is made of relatively soft, compressible, and resilient rubber-like material, such as neoprene, and comprises a longitudinally elongated body portion 28 having a lateral external annular rounded bead 30 on its lower end, and an enlarged diameter flat annular head 32 on its upper end. In assembling the stem 26 on the float body 20, the lower end of the stem and the bead 30 are forced downwardly through the upper end of the bore 22 until the bead 30 expands and engages the lower end of the float body 20, and the head 32 engages the upper end of the float body. The upper end of the float body 20 is preferably flattened, as indicated at 34, to form a flat surface which is non-deformably engaged by the head 32, as seen in Figures 3 and 6.

The upper or top side of the stem head 32 is concentrically dished or concaved, as indicated at 36, so as to provide a centering guide for the tip 12 of a fishing rod, when the float 18 is drawn up to the tip 12, whereby the rod tip 12, and hence the fishing line 14 running through the tip, are maintained in axial relation to and free running in the bore 38 of the stem 26, and in the line opening 40 in the stem head 32. The line opening 40 is smaller than and is centered with respect to the stem bore 40 and is defined by the radially inward ends 42 of circumferentially spaced radially inwardly projecting line-gripping fingers 44 whose sides are in touching relation and are sides of radial slits 46 which separate adjacent fingers 44. As shown in Figures 5 and 6, the inward ends 42 of the fingers 44 are arcuate so as to define V-shaped converging entrances 48 into the slits 46. The upper and lower corners of the inward ends 42 are rounded, as indicated at 50, to provide against chafing of a fishing line and for its free passage through the line opening 40.

Because of the tapered reduction of the cross section of the fingers 44 toward their inward ends 42 produced by the concavity 36, the inward ends of the fingers are somewhat more flexible than the outer ends thereof, so that a fishing line engaged in an entrance 48 and pulled sidewise in a radially outward direction, readily enters the related slit 46 and progresses therein in a radially outward direction, so as to become increasingly tightly wedged between the sides of the slit, so that the fishing line is held in the slit and the float 18 is set on the line and is prevented from moving along the line in either direction, unless and until the float 18 is manually manipulated in a manner to disengage the line from the slit; or the line is jerked sidewise in a direction to withdraw the line from a slit 46 in which it is engaged.

Setting of the float 18 on a fishing line, as described above, is readily obtained in the course of paying out fishing lines downwardly beyond the float 18, when the float is afloat on water, as shown in Figure 2, by simply jerking the line in a sidewise direction relative to the float 18.

The float 18 is engaged on a fishing line 14, with the stem 26 removed from the float body 20, by pushing the line 14 through a longitudinal slit 52 which is formed completely through one side of the stem 26, including the body portion 28, the bead 30, and the head 32; and then putting the line 14 in the slot 24 in the float body 20, and then pushing the stem 26 into place in the float body 20.

The form of the invention shown in Figure 7, and generally designated 18a, is the same in construction as that shown in Figures 1 to 6, except that its head 32a, while being annular, is of vertical tubular form, and its line-gripping fingers 44a are vertical, rather than horizontal and are separated by circumferentially spaced slots 46a, Converging entrances 48a are provided for the slits 46a at the upper end of the head 32a.

Although there has been shown and described herein preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A settable fishing line float comprising a buoyant float body having a bore therethrough, a single tubular line passing stem extending through said body bore and secured to said float body and having an axial bore, and at least one pair of laterally adjacent line gripping fingers on the wall of said stem bore, said fingers being resilient and deformable and having sides in touching relation and separated by a slit, and a line extending through said stem being adapted to be engaged and disengaged between sides of fingers by sidewise movements of the line relative to the stem.

2. A settable fishing line float comprising a buoyant float body having a bore therethrough, a resilient and compressible tubular stem having a relatively large diameter bore and a relatively thin side wall, said side wall having an outside diameter slightly larger in diameter than the body bore, said stem being compressed and passed through and frictionally engaged in the body bore, said side wall having thereon at least one pair of internal radial and laterally adjacent resilient fingers defining a fishing line gripping slit between the fingers.

3. A settable fishing line float according to claim 2, wherein said body and the stem side wall have radial fishing line passing slots.

4. A settable fishing line float according to claim 2, wherein said stem has an enlarged lateral annular head on one end thereof bearing against the float body at one end of the body bore, and a lateral annular bead on the other end of the stem bearing against the float body at the other end of the body bore.

5. A settable fishing line float consisting of a buoyant float body having a bore extending therethrough, a resilient and compressible and monolithic tubular stem having a relatively thin side wall and first and second ends, said stem extending through said body bore and being under compression in and frictionally engaged in the body bore, at least one pair of laterally adjacent fingers on and extending radially inwardly from said side wall, said fingers having adjacent sides defining a fishing line gripping slit therebetween.

6. A settable fishing line float consisting of a buoyant float body having a bore extending therethrough, a resilient and compressible and monolithic tubular stem having a relatively thin side wall and first and second ends, said stem extending through said body bore and being under compression in and frictionally engaged in the body bore, at least one pair of laterally adjacent fingers on and extending radially inwardly from said side wall, said fingers having adjacent sides defining a fishing line gripping slit therebetween, said pair of fingers being located at said first end of the stem, and an annular laterally enlarged head on said first end of the stem and bearing against the exterior of the float body.

References Cited in the file of this patent
UNITED STATES PATENTS

| | | |
|---|---|---|
| 668,254 | Dickinson | Feb. 19, 1901 |
| 771,263 | McCord | Oct. 4, 1904 |
| 2,001,241 | DeVries | May 14, 1935 |
| 2,035,930 | Strong | Mar. 31, 1936 |
| 2,591,332 | Behensky | Apr. 1, 1952 |
| 2,785,499 | Simpson | Mar. 19, 1957 |
| 2,807,907 | Brite | Oct. 1, 1957 |
| 2,834,142 | Saye | May 13, 1958 |